US012780225B2

(12) United States Patent
Henderson et al.

(10) Patent No.: US 12,780,225 B2

(45) Date of Patent: Nov. 3, 2026

(54) DISTRIBUTED CONTROL FOR VEHICLE COMBINATIONS

(71) Applicant: VOLVO TRUCK CORPORATION, Gothenburg (SE)

(72) Inventors: Leon Henderson, Härryda (SE); Mats Jonasson, Partille (SE); Simon Schoutissen, Torslanda (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 49 days.

(21) Appl. No.: 18/934,784

(22) Filed: Nov. 1, 2024

(65) Prior Publication Data

US 2025/0162598 A1 May 22, 2025

(30) Foreign Application Priority Data

Nov. 20, 2023 (EP) .................................... 23210854

(51) Int. Cl.

*B60W 30/182* (2020.01)
*B60W 50/00* (2006.01)

(Continued)

(52) U.S. Cl.

CPC ...... *B60W 50/0205* (2013.01); *B60W 30/182* (2013.01); *B60W 50/0097* (2013.01);

(Continued)

(58) Field of Classification Search

CPC ............. B60W 50/029; B60W 50/023; B60W 50/0097; B60W 30/182; B60W 50/0205;

(Continued)

(56) References Cited

U.S. PATENT DOCUMENTS 10,525,946 B2 * 1/2020 Shimanaka .......... B62D 15/021
2005/0288843 A1 * 12/2005 Lindqvist ................ B60T 17/22
701/70

(Continued)

FOREIGN PATENT DOCUMENTS

DE 102019205480 A1 10/2020
EP 4151489 A1 3/2023

OTHER PUBLICATIONS

Extended European Search Report in corresponding European Application No. 23210854.8 dated Apr. 30, 2024 (8 pages).

*Primary Examiner* — Stephen Holwerda

(74) *Attorney, Agent, or Firm* — Jeffri A. Kaminski; Venable LLP

(57) ABSTRACT

A computer system for a vehicle combination is disclosed. The computer system has a first controller implemented in a first unit of the vehicle combination. The first controller, in a first mode of operation, determines a requested unit control input for one or more units of the vehicle combination based on a reference input representing a requested movement of the vehicle combination. A second controller is implemented in a second unit of the vehicle combination. The second controller, in the first mode of operation, receives a requested unit control input for the second unit from the first controller, and implements the requested unit control input for the second unit in the second unit, and, in a second mode of operation, determines a requested unit control input for one or more units of the vehicle combination based on the reference input.

18 Claims, 6 Drawing Sheets

(51) Int. Cl.
*B60W 50/02* (2012.01)
*B60W 50/029* (2012.01)

(52) U.S. Cl.
CPC ..... *B60W 50/029* (2013.01); *B60W 2050/021* (2013.01); *B60W 2050/0292* (2013.01); *B60W 2300/14* (2013.01)

(58) Field of Classification Search
CPC ..... B60W 2300/14; B60W 2050/0006; B60W 2050/021; B60W 2050/0292
See application file for complete search history.

(56) References Cited

U.S. PATENT DOCUMENTS

| | | | | |
|---|---|---|---|---|
| 2007/0194557 | A1 | 8/2007 | Caporali et al. | |
| 2007/0293989 | A1 | 12/2007 | Norris | |
| 2008/0296106 | A1* | 12/2008 | Nilsson | B60T 8/345 701/115 |
| 2014/0046566 | A1* | 2/2014 | Maitlen | B60T 8/1701 701/70 |
| 2022/0097786 | A1* | 3/2022 | Heseding | B60D 1/62 |
| 2022/0306063 | A1* | 9/2022 | Choi | B60T 13/741 |
| 2022/0340115 | A1 | 10/2022 | Knosmann et al. | |

* cited by examiner

DISTRIBUTED CONTROL FOR VEHICLE COMBINATIONS

TECHNICAL FIELD

The disclosure relates generally to vehicle control. In particular aspects, the disclosure relates to distributed control for vehicle combinations. The disclosure can be applied to heavy-duty vehicles, such as trucks, buses, and construction equipment, among other vehicle types. Although the disclosure may be described with respect to a particular vehicle, the disclosure is not restricted to any particular vehicle.

BACKGROUND

A control system for a vehicle combination may comprise a primary controller and a secondary (back-up) controller for use if and when the primary controller fails, for example to continue the vehicle's mission, or to enable a safe stop manoeuvre to be performed. The controllers are typically located in the tractor unit of the vehicle combination. However, significant additional infrastructure is required to implement a secondary controller that is only active in the case of a fault, for example hardware required to implement the secondary controller and infrastructure to detect faults in the primary controller.

It is therefore desired to provide systems, methods and other approaches that attempt to resolve or at least mitigate one or more of these issues.

SUMMARY

This disclosure provides systems, methods and other approaches for controlling a vehicle combination. In particular, a control system is provided comprising a first controller implemented in a first unit of the vehicle combination and a second controller implemented in a second unit of the vehicle combination. During normal operation, the first controller is configured to determine control inputs for other units of the vehicle combination, and the second controller is configured to receive and implement a control input for the second unit. In another mode of operation, for example where there is a fault with the first controller or the first unit, the second controller is configured to determine control inputs for other units of the vehicle combination.

According to a first aspect of the disclosure, there is provided a computer system comprising processing circuitry configured to implement a first controller implemented in a first unit of the vehicle combination, the first controller configured to, in a first mode of operation, determine a requested unit control input for one or more units of the vehicle combination based on a reference input representing a requested movement of the vehicle combination, a second controller implemented in a second unit of the vehicle combination, the second controller configured to, in the first mode of operation, receive a requested unit control input for the second unit from the first controller, and implement the requested unit control input for the second unit in the second unit, and, in a second mode of operation, determine a requested unit control input for one or more units of the vehicle combination based on the reference input.

The first aspect of the disclosure may seek to provide an approach to vehicle motion management that provides redundancy for the functions of a primary controller, such that safe and accurate control of the vehicle combination can be ensured at all times. By implementing a secondary controller in a different unit from the primary controller, it can be used independent of the status of the primary controller and its unit (e.g. in case of failure). Another advantage of this approach is that these functions can be provided by a controller that may already be implemented in the vehicle combination, thus negating the need for the additional infrastructure required for an additional independent back-up controller.

Optionally in some examples, including in at least one preferred example, the second mode of operation is triggered by detection of a fault associated with the first controller and/or the first unit. A technical benefit may include that redundancy for the functions of a primary controller is provided in case of error or failure of the primary controller, such that safe and accurate control of the vehicle combination can be ensured at all times.

Optionally in some examples, including in at least one preferred example, the processing circuitry is further configured to implement a monitor configured to monitor operation of the first controller and/or the first unit and detect the fault. A technical benefit may include reactive and real-time detection of fault associated with a primary controller and/or its unit.

Optionally in some examples, including in at least one preferred example, the monitor is configured to detect the fault by comparing the requested control input from the first controller with one or more requested unit control inputs and/or one or more limits. A technical benefit may include the provision of an accurate and robust approach to detecting faults in a controller.

Optionally in some examples, including in at least one preferred example, the monitor is configured to detect the fault by determining sensor values and/or covariance values associated with one or more units of the vehicle combination. A technical benefit may include the provision of an accurate and robust approach to detecting faults in a controller.

Optionally in some examples, including in at least one preferred example, the monitor is implemented in the second controller. A technical benefit may include that the performance of a primary controller may be monitored externally from its unit, ensuring accurate and robust fault detection.

Optionally in some examples, including in at least one preferred example, in the second mode of operation, the second controller is configured to implement a requested unit control input for the first unit in the first unit. A technical benefit may include the provision of control of a unit even in the case that the controller of that unit has a fault.

Optionally in some examples, including in at least one preferred example, the processing circuitry is further configured to implement a comparator, and, in the first mode of operation, the second controller is configured to determine a predicted unit control input for the one or more units of the vehicle combination based on the reference input, and the comparator is configured to compare the one or more requested unit control inputs from the first controller and the one or more predicted unit control inputs from the second controller, and, if there is a difference between the one or more requested unit control inputs and the one or more predicted unit control inputs, determine that there is a fault associated with the first controller or the second controller. A technical benefit may include the provision of an accurate and robust approach to detecting faults in a controller.

Optionally in some examples, including in at least one preferred example, the processing circuitry is further configured to implement a dummy controller and, in the first mode of operation, the dummy controller is configured to determine a dummy unit control input for the one or more units of the vehicle combination based on the reference input, and the comparator is further configured to compare the one or more requested unit control inputs, the one or more predicted vehicle control inputs, and the one or more dummy vehicle control inputs, and determine which of the first controller or the second controller has a fault based on the comparison. A technical benefit may include the provision of an accurate and robust approach to detecting faults in a controller.

Optionally in some examples, including in at least one preferred example, the processing circuitry is further configured to implement a third controller configured to implement a minimum risk manoeuvre in response to detection of a fault associated with the first controller and/or the second controller. A technical benefit may include a the provision of a fail-safe mechanism that enables the vehicle combination to be controlled in a safe manner in case of failure of one or more controllers.

Optionally in some examples, including in at least one preferred example, the first unit is a tractor unit of the vehicle combination, and the second unit is a trailing unit of the vehicle combination. A technical benefit may include the provision of redundancy for the functions of a primary controller that can be implemented in existing control infrastructure of a vehicle combination.

According to a second aspect of the disclosure, there is provided a vehicle comprising the computer system. The second aspect of the disclosure may seek to provide a vehicle combination with redundancy for the functions of a primary controller that can be implemented in existing control infrastructure.

According to a third aspect of the disclosure, there is provided a computer-implemented method comprising, in a first mode of operation, determining, at a first controller implemented in a first unit of a vehicle combination, a requested unit control input for one or more units of the vehicle combination based on a reference input representing a requested movement of the vehicle combination, receiving, by a second controller implemented in a second unit of the vehicle combination, a requested unit control input for the second unit from the first controller, and implementing, by the second controller, the requested unit control input for the second unit in the second unit, and, in a second mode of operation, determining, by the second controller, a requested unit control input for one or more units of the vehicle combination based on the reference input.

The third aspect of the disclosure may seek to provide an approach to vehicle motion management that provides redundancy for the functions of a primary controller, such that safe and accurate control of the vehicle combination can be ensured at all times. By implementing a secondary controller in a different unit from the primary controller, it can be used independent of the status of the primary controller and its unit (e.g. in case of failure). Another advantage of this approach is that these functions can be provided by a controller that may already be implemented in the vehicle combination, thus negating the need for the additional infrastructure required for an additional independent back-up controller.

According to a fourth aspect of the disclosure, there is provided a computer program product comprising program code for performing, when executed by processing circuitry, the computer-implemented method. The fourth aspect of the disclosure may seek to provide program code for providing redundancy for the functions of a primary controller. A technical benefit may include that new vehicles and/or legacy vehicles may be conveniently configured, by software installation/update, to be controlled in an improved manner.

According to a fifth aspect of the disclosure, there is provided a non-transitory computer-readable storage medium comprising instructions, which when executed by processing circuitry, cause the processing circuitry to perform the computer-implemented method. The fifth aspect of the disclosure may seek to provide program code for providing redundancy for the functions of a primary controller. A technical benefit may include that new vehicles and/or legacy vehicles may be conveniently configured, by software installation/update, to be controlled in an improved manner.

The disclosed aspects, examples (including any preferred examples), and/or accompanying claims may be suitably combined with each other as would be apparent to anyone of ordinary skill in the art. Additional features and advantages are disclosed in the following description, claims, and drawings, and in part will be readily apparent therefrom to those skilled in the art or recognized by practicing the disclosure as described herein.

There are also disclosed herein computer systems, control units, code modules, computer-implemented methods, computer readable media, and computer program products associated with the above discussed technical benefits.

BRIEF DESCRIPTION OF THE DRAWINGS

Examples are described in more detail below with reference to the appended drawings.

Like reference numerals refer to like elements throughout the description.

DETAILED DESCRIPTION

The detailed description set forth below provides information and examples of the disclosed technology with sufficient detail to enable those skilled in the art to practice the disclosure.

A control system for a vehicle combination may comprise a primary controller and a secondary (back-up) controller for use if and when the primary controller fails. Both controllers are typically located in the tractor unit of the vehicle combination. Such implementations require significant additional infrastructure to implement a secondary controller that is only active in the case of a fault. Furthermore, if the controllers are located in the same unit, serious failure of that unit may result in both controllers failing.

To remedy this, systems, methods and other approaches are provided for controlling a vehicle combination. In particular, a control system is provided comprising a first controller implemented in a first unit of the vehicle combination and a second controller implemented in a second unit of the vehicle combination. During normal operation, the first controller is configured to determine control inputs for other units of the vehicle combination, and the second controller is configured to receive and implement a control input for the second unit. In another mode of operation, for example when there is a fault with the first controller or the first unit, the second controller is configured to determine control inputs for other units of the vehicle combination.

This can ensure safe and accurate control of the vehicle combination at all times. By implementing the second controller in a different unit from the first controller, it can be used independent of the status of the first controller and its unit (e.g. in case of failure of the first controller or serious failure of the first unit). Another advantage of this approach is that the second controller can be implemented in existing control infrastructure of a vehicle unit. For example, modern 'smart' trailers have controllers for coordinating various devices of the individual unit (e.g. service brake actuators, propulsion devices, steered axles, auto docking systems). The trailer controllers may operate in a master-slave configuration with a primary controller located in a tractor unit. These existing trailer controllers can be used as a second controller for the vehicle combination, and take over in case of a fault with the first controller, thus negating the need for the additional infrastructure required for an additional independent back-up controller.

Figure 1:
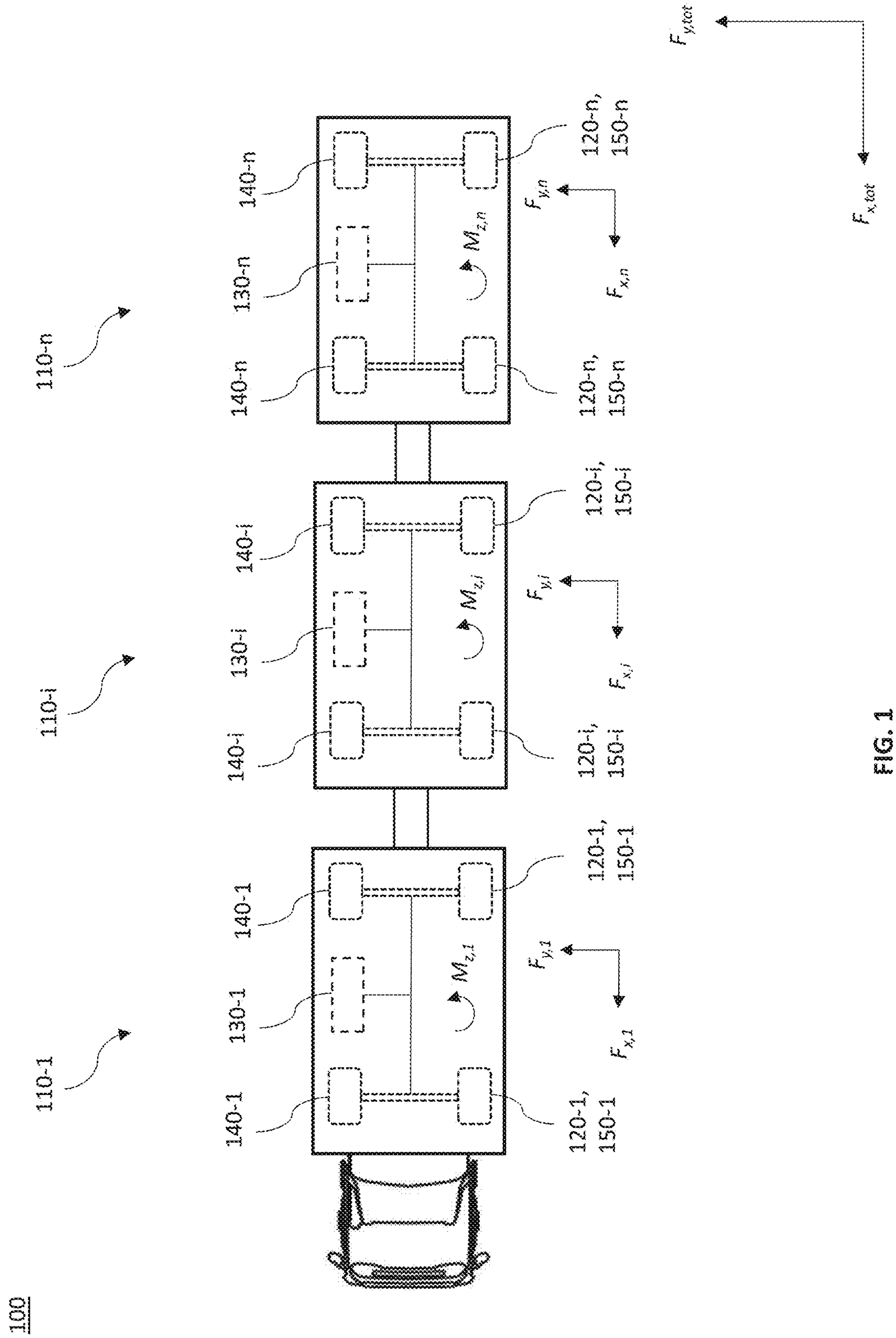
FIG. 1 schematically shows a top view of a vehicle combination according to an example.

FIG. 1 schematically shows a top view of an example vehicle combination 100 of the type considered in this disclosure. The vehicle combination 100 comprises a number of units 110, including a tractor unit and at least one trailing unit. Each unit 110 may be given an index i, and the total number of units 110 in a vehicle combination 100 is designated n. Whilst two trailing units are shown, it will be appreciated that the vehicle combination 100 may comprise more or fewer trailing units connected to each other. This gives rise to different types and designations of vehicle combinations.

A tractor unit, such as the tractor unit 110-1, is generally the foremost unit in a vehicle combination 100, and may comprise the cabin for the driver, including steering controls, dashboard displays and the like. Generally, the tractor unit 110-1 is used to provide propulsion power for the vehicle combination 100. In the example of FIG. 1, the tractor unit 110-1 may also be used to store goods that are being transported by the vehicle combination 100.

A trailing unit, such as the trailing units **110-*i*, 110-*n*, is generally used to store goods that are being transported by the vehicle combination 100. A trailing unit may be a truck, trailer, dolly and the like. A trailing unit may also provide propulsion to the vehicle combination 100. A trailing unit without a front axle is known as a semi-trailer. In vehicle combinations such as that shown in FIG. 1**, vehicle motion management is available on a unit level to receive requests from a manual or virtual driver to coordinate the propulsion, braking and steering, as will be discussed below.

Whilst two axles per unit 110 are shown, it will be appreciated that any suitable number of axles may be provide on the respective units 110. It will also be appreciated that any number of the tractor axles and/or trailer axles may be driven axles, including zero (i.e. one of the units 110 may include at least one driven axle while the other does not).

The vehicle combination 100 may comprise one or more sources of propulsion. For example, one or more of the units 110 may comprise one or more electrical machines 120 (such as electric motors). Each unit 110 may comprise one or more batteries 130 configured to provide power to electrical machines 120. In some examples, a unit 110, most often a tractor unit 110-1, may also include another source of propulsion, for example an internal combustion engine (ICE). The vehicle combination 100 also comprises a drivetrain (not shown) to deliver mechanical power from the propulsion source (the electrical machines 120 or the ICE) to the wheels. All units 110 may provide propulsion to the vehicle combination 100.

The electrical machines 120 are configured to drive, e.g. provide torque and/or steering to, one or more axles or individual wheels of the unit 110. The electrical machines 120 of a unit 110 can supply either a positive (propulsion) or negative (braking) force. In some examples, electric motors may also be operated as generators, in order for the electric motors to generate braking force when required. The use of electrical machines 120 to supply a negative force is known as regenerative braking.

Furthermore, each unit 110 may comprise one or more sets of service brakes 140. The service brakes 140 of a unit 110 can supply a negative (braking) force. The service brakes 140 may be, for example, frictional brakes such as pneumatic brakes. Pneumatic brakes use a compressor to fill the brake with air, which may be powered by the batteries 130. In some examples, the service brakes may be electromechanical or hydraulic brakes. The energy recovered from regenerative braking can be stored in the batteries 130, and so regenerative braking by the electrical machines 110 may generally be preferred over using service brakes.

The ICE, electrical machines 120 and service brakes 140 are considered as actuators of the vehicle combination 100. Other actuators may also be present. For example, steering actuators 150, such as steering servo arrangements, may be provided, and may be implemented as electro-hydraulic actuators. Each actuator in a given unit 110 may be given an index k, and the total number of actuators in a given unit 110 is designated m. The electrical machines 120, service brakes 140, and steering actuators 150 are shown as being on respective sides of each vehicle unit 110, but it will be appreciated that each axle and/or wheel may have an associated electrical machine 120, set of service brakes 140, and/or set of steering actuators 150.

FIG. 1 also shows the forces of the vehicle combination 100. Examples of global forces of the vehicle combination 100 as a whole may include a total longitudinal/axial force $F_{x.tot}$ and a total lateral/radial force $F_{y,tot}$. Examples of unit forces of the vehicle combination 100 may include a longitudinal/axial force $F_{x.i}$, a lateral/radial force $F_{y,i}$, and/or one or more yaw moments $M_{z,i}$ for the respective vehicle units 110. In order to control motion of a vehicle combination 100, the forces of the vehicle combination 100 must be determined and resolved. This may be achieved by a control system 200 (shown in FIG. 2) of the vehicle combination 100 that determines control data based on a requested reference input and certain operating conditions of the vehicle combination 100.

Figure 2:
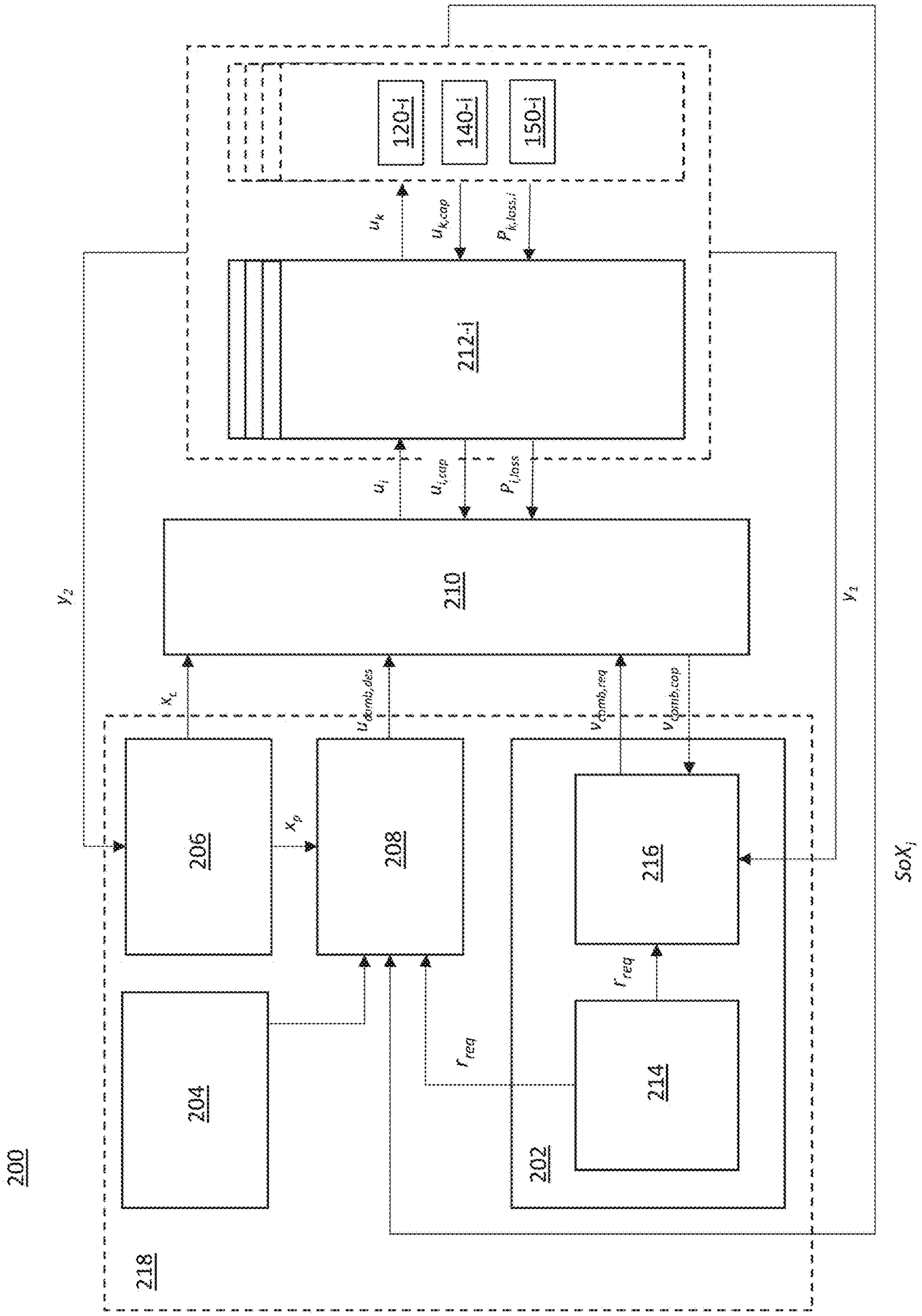
FIG. 2 schematically shows, in terms of functional blocks, a control system for a vehicle according to an example.

FIG. 2 schematically shows, in terms of functional blocks, an example control system 200 for a vehicle, such as the vehicle combination 100. The control system 200 serves to perform various functions of the vehicle combination 100, such as power management and motion coordination. The control system 200 comprises a target generator 202, a tactical layer 204, a state estimator 206, an energy manager 208, a combination control allocator 210 and a plurality of unit control allocators 212. The various modules may e.g. be implemented as code running on a processing circuitry, or similar. The various modules may comprise processing circuitry configured to implement various operations disclosed below. The various modules may may include a memory storing instructions that, when executed by the processing circuitry, cause the processing circuitry to perform the various operations. The various modules may be communicatively connected or connectable to each other, for example as known in the art.

The purpose of the target generator 202 is to determine a requested input $r_{req}$ and a virtual control input $v_{comb,req}$ for the vehicle combination 100. The requested input $r_{req}$ is determined based on an input related to a manoeuvre for the vehicle combination 100 and represents a requested movement of the vehicle combination 100. The virtual combination control input $v_{comb,req}$ is determined based on the requested reference input $r_{req}$ and a motion capability $v_{comb,cap}$ for the vehicle combination 100. The target generator 202 comprises a path planner/controller 214 and a force generator 216.

In particular, the target generator 202 may receive an input related to a manoeuvre for the vehicle combination 100. The manoeuvre may be, for example, straight-line driving, cornering, braking and the like. The target generator 202 may receive data from, for example, a steering wheel and/or gas/brake pedal of the combination 100, indicating that the driver (or some other system of the vehicle combination 100) wants to change the direction and/or the speed of the vehicle combination 100 in a certain way. In some examples, the data may originate from elsewhere, for example any other system that may provide some indication of how the overall forces of the vehicle combination 100 are to be influenced (e.g. steered, propelled or braked). For example, the data may originate from a lane assist system, a lane following system, an emergency steering system, an emergency braking system, an automated or semi-automated drive system. Based on this input, the target generator 202 outputs a requested reference input $r_{req}$. In particular, the path planner/controller 214 determines the requested reference input $r_{req}$. The requested reference input $r_{req}$ may comprise at least one of a longitudinal acceleration $a_x$ of the vehicle combination 100 as a whole or of a unit 110 of the vehicle combination 100 (for example the unit 110 comprising the combination control allocator 210), a longitudinal velocity $v_{x1}$ of the tractor unit 110-1, a lateral velocity $v_{y1}$ of the tractor unit 110-1, a yaw rate $\omega_{zi}$ of at least one unit 110 of the vehicle combination 100, and a steering angle $\delta_{f,\ req}$ of the tractor unit 110-1.

The virtual combination control input $v_{comb,req}$ is determined based on the requested input $r_{req}$. In particular, the force generator 216 determines the virtual combination control input $v_{comb,req}$. The virtual combination control input $v_{comb,req}$ may include requested motion parameters for the vehicle combination 100. In particular, the forces $F_{tot,req}$ and/or moments $M_{z,tot,req}$ that need to be applied to the vehicle combination 100 as a whole in order to follow the requested input $r_{req}$ are determined. The requested motion parameters included in the combination virtual control input $v_{comb,req}$ of the vehicle combination 100 may comprise at least one of a longitudinal force $F_{x,tot,req}$ of the vehicle combination 100, a lateral force $F_{y,tot,req}$ of the vehicle combination 100, a longitudinal coupling force $F_{cxi,req}$ between consecutive units 110, and a lateral coupling force $F_{cyi,req}$ between consecutive units 110. These make up the total force to be applied $F_{tot,req}$ for the vehicle combination 100. The requested motion parameters included in the combination virtual control input $v_{comb,req}$ of the vehicle combination 100 may comprise a yaw moment $M_{z,i,req}$ for one or more units 110.

The virtual combination control input $v_{comb,req}$ may also be determined based on state information $y_1$ from the different units 110 of the vehicle combination 100 and a motion capability $v_{comb,cap}$ for the vehicle combination 100. The state information $y_1$ may include information from sensors of the vehicle combination 100 such as wheel speed sensors, inertial measurement units, articulation angle sensors and the like. The motion capability $v_{comb,cap}$ of the vehicle combination 100 may describe the limits of motion parameters for safe operation of the vehicle combination 100. The motion capability $v_{comb,cap}$ may comprise at least one of a longitudinal force $F_{x.tot,cap}$ of the vehicle combination 100, a lateral force $F_{y,tot,cap}$ of the vehicle combination 100, and a yaw moment $M_{z,i,cap}$ for one or more units 110.

The virtual combination control input $v_{comb,req}$ may be determined based on a vehicle model. The vehicle model can be any suitable model, for example a model known in the art. The model can be based on real tests, computer model simulations, a machine-learning model, or other suitable means known in the art. The vehicle model may provide motion prediction of the vehicle combination 100 by looking at previous steering input and acceleration input. The prediction may include instabilities such as understeer or rollover risk, for example within a one-second horizon. The model may be, for example, a single-track model, i.e., left and right wheels on a given axle are considered together. The real units can have axle groups with several axles, but in the model they are considered together. A tyre model can be used in combination with the vehicle model. The tyre model may take into account the cornering stiffness of the tyres of the vehicle combination 100.

The tactical layer 204 is responsible for ensuring that the trajectory for the whole combination 100 is obstacle free and collision free. The tactical layer 204 may also provide a requested reference input in an autonomous driving case. The tactical layer 204 may also include predictive energy management, including battery targets, capabilities and statuses that determine how the energy sources of the vehicle combination 100 should be used for a whole mission.

In some examples, the tactical layer 204 can decide on state of charge (SoC) targets for the batteries 130 of the vehicle combination 100 as a function of distance, in some cases considering slope changes, etc. For example, the tactical layer 204 can request the battery 130 of a unit 110 having a higher SoC be drained for an uphill slope, as it can foresee that batteries 130 of all units 110 can be charged fully with regenerative braking at a following downhill slope. In some examples, an SoC controller (not shown) can calculate weighting factors for SoC targets. In some examples, the tactical layer 204 can send targets for the state of energy rate (SȯE) directly to the combination control allocator 210.

Furthermore, the tactical layer 204 can request the transfer of energy from one unit 110 to another by means of propulsion in one unit 110 and regenerative braking in the other (as explained in WO 2021/180300 A1 in the name of Volvo Truck Corporation). In another example, the tactical layer 204 requests the battery 130 of a unit 110 to be drained faster than the battery 130 of another unit 110 based on the number of available chargers in a following charge station or due to equalizing the charging time of all units 110 or minimizing the total charging time at the charging station.

The state estimator 206 is responsible for processing state information $y_2$ from the different units 110 of the vehicle combination 100. For example, the state estimator 206 may receive information from sensors of the vehicle combination 100 such as wheel speed sensors, inertial measurement units, articulation angle sensors and the like and use this information to determine states for the vehicle combination 100 and the various units. The state estimator 206 may then output unit-specific state information $x_p$ to the energy manager 208 and unit-specific state information $x_c$ to the combination control allocator 210.

The energy manager 208 determines a power split between the different units 110 of the vehicle combination 100. The energy manager 208 may also determine a power split within each unit 110, meaning how the power demand is divided between the actuators (for example, the ICE, the electrical machines 120, service brakes 140, and/or steering actuators 150) of the unit 110. Inputs to the energy manager 208 include the requested reference input $r_{req}$ from the target generator 202 and the statuses SoX of the batteries 130 of the vehicle combination 100. The energy manager 208 determines a power allocation and an associated power allocation input $u_{comb,des}$. The power split may be determined based on the state of energy rate (SȯE) for each unit 110 and/or the longitudinal part of the requested force for the unit's propulsion system $F_{xpi,req}$. The energy manager 208 may consider factors that affect long-term energy consumption, such as road slopes, SoC states, charger locations, and the like, and determine power behavior as a function of the energy over time. The energy manager 208 may also be configured as a power manger. For example when a time horizon is considered, it may handle energy. When instantaneous values are considered, it may handle power.

Based on these values, the control allocators 210, 212 may determine control data that meets the requested global forces of the vehicle combination 100 to meet certain constraints, such as power management (optimising battery usage) and safety constraints (ensuring that the trajectory for the whole combination 100 is obstacle free and collision free). In particular, the control allocators 210, 212 determine how various actuators (for example, the ICE, the electrical machines 120, service brakes 140, and/or steering actuators 150) of the vehicle combination 100 are to be controlled in order to generate requested global forces of the vehicle combination 100 as a whole. The combination control allocator 210 and the various unit specific control allocators 212 together form a distributed control allocation system for the vehicle combination 100. In this system, the control allocation is performed on multiple levels, i.e. first on a level of the vehicle combination 100 as a whole, and then on a level of each vehicle unit 110 individually.

The combination control allocator 210 transforms the virtual combination control input $v_{comb,req}$ from the target generator 202 into a true control input $u_{comb}$ for the vehicle combination 100, describing appropriate motion parameters for each unit 110. The combination control allocator 210 also transforms the true combination control input $u_{comb}$ into requested unit control inputs $u_i$ describing the forces that each respective unit 110 is to produce in order to provide the true control input $u_{comb}$ of the vehicle combination 100. The true control input $u_{comb}$ of the vehicle combination 100 comprises the force F to be applied for the vehicle combination 100. The requested unit control inputs $u_i$ may comprise a virtual force control input for the unit's propulsion system $F_{pi,req}$ and a virtual force control input for the unit's braking system $F_{bi,req}$.

The unit control allocators 212 comprise a specific control allocator 212 for each unit 110 of the vehicle combination 100. The unit-specific virtual control inputs $u_i$ that are output from the combination control allocator 210 are transformed into unit-specific true control inputs $u_k$, describing actual actuator commands by the unit-specific control allocators 212. For example, the unit-specific control allocators 212 map the forces and moments of each unit 110 into the steering and drive/brake torques to be applied at the wheels of each unit 110. To do this, the unit control allocators 212 may determine virtual force control inputs for the individual actuators of the unit's different systems: $F_{pk,req}$ for the actuators of the propulsion system, and $F_{bk,req}$ for the actuators of the braking system. The unit control allocators 212 then determine the unit-specific true control inputs $u_k$ accordingly, which comprise a true force control input for the unit's propulsion system $F_{pi}$ and a true force control input for the unit's braking system $F_{bi}$. These may respectively include true force control inputs for the individual actuators of a unit: $F_{pk}$ for the unit's propulsion actuators and $F_{bk}$ for the unit's braking actuators.

In some examples, each unit 110 may be capable of estimating its own capabilities $u_{i,cap}$, e.g. how much and/or how fast the unit can move at a current time instant. The unit capabilities comprise a force capability for its propulsion system $F_{pi,cap}$ and a force capability for its braking system $F_{bi,cap}$. This may be based on an actuator capability $u_{k,cap}$ for each actuator, e.g. how much and/or how fast the unit can move at a current time instant. The actuator capabilities comprise a force capability for the actuators $F_{pk,cap}$ during propulsion and a force capability for the actuators $F_{bk,cap}$ during braking. The actuators of each unit 110 may provide an actuator capability $u_{k,cap}$ to the respective unit control allocator 212-*i*, which provides a unit capability $u_{i,cap}$ to the combination control allocator 210. The unit capabilities $u_{i,cap}$ may also comprise capabilities of the power input/output of the batteries 130.

Each unit 110 may also be capable of estimating its own power losses $P_{i,loss}$. The unit power losses $P_{i,loss}$ comprise a power loss for its propulsion system $P_{pi,loss}$ and a power loss for its braking system $P_{bi,loss}$. This may be based on actuator power losses $P_{k,loss,i}$ for each actuator in the unit as well as other power losses in the unit 110, such as power losses in the batteries and the drivetrain. The actuator power losses $P_{k,loss,i}$ comprise a power loss for propulsion actuators $P_{pk,loss,i}$ (e.g. electrical machines 120, ICE, and/or other propulsion sources) and a power loss for braking actuators $P_{bk,loss,i}$ (e.g. electrical machines 120 and/or service brakes 140). The actuators of each unit 110 may provide the actuator power losses $P_{k,loss,i}$ to the respective unit control allocator 212-*i*, which provides unit power losses $P_{i,loss}$ to the combination control allocator 210.

Typically, the combination control allocator 210 of FIG. 2 is implemented in the controller of the tractor unit 110-1, while a controller of each unit 110 comprises a specific unit control allocator 212. In such an implementation, the controller of the tractor unit 110-1 determines the unit-specific virtual control inputs $u_i$ for each respective unit 110, and may be known as the primary controller. The controllers of the trailing units 110-2 to 110-*n*, each comprising a respective unit control allocator 212, then provide unit-specific true control inputs $u_k$ as actuator commands for the actuators of the respective unit 110. In this way, the combination control allocator 210 and the various unit specific control allocators 212 together form a distributed control allocation system for the vehicle combination 100. Control allocation may therefore be performed on multiple levels, i.e. first on a level of the vehicle combination 100 as a whole, and then on a level of each vehicle unit 110 individually. The target generator 202, tactical layer 204, state estimator 206, and energy manager 208 may be collectively known as a motion and energy manager 218. The motion and energy manager 218 may be implemented remotely from the vehicle combination 100 or on board the vehicle combination 100, for example in the primary controller. If these modules are located remotely from the vehicle combination 100, they may be communicatively coupled to the vehicle combination 100.

Figure 3:
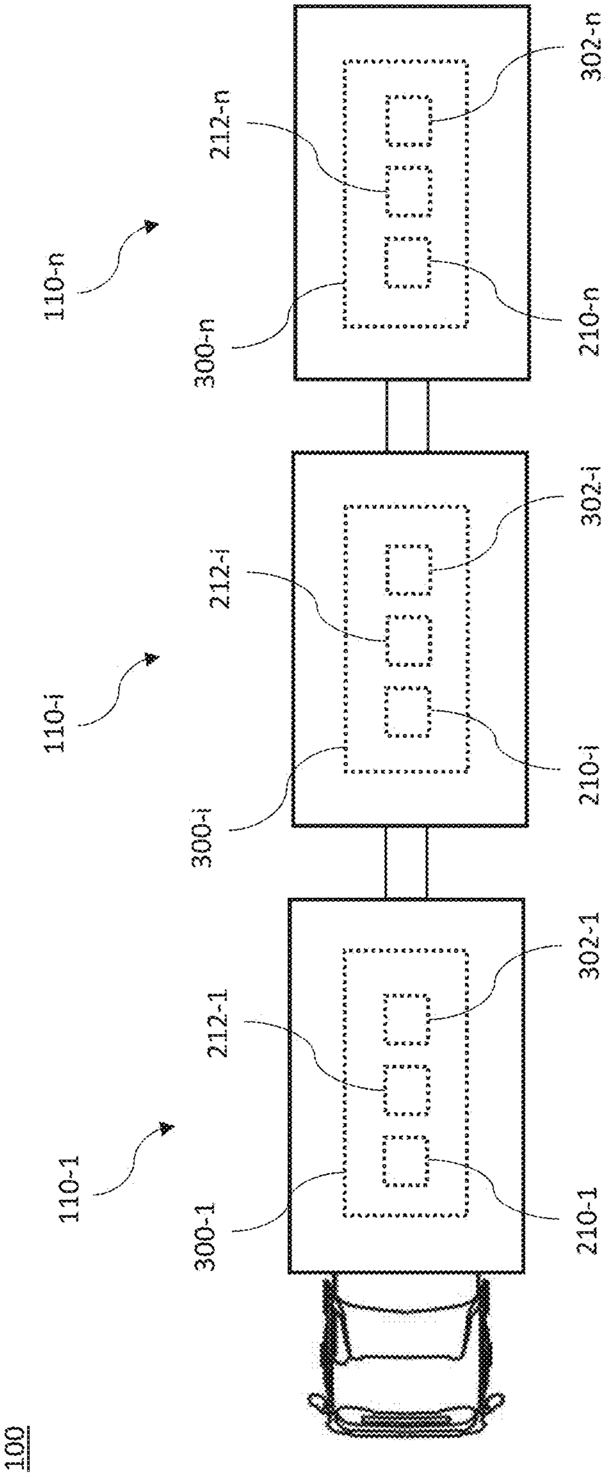
FIG. 3 schematically shows an implementation of the control system in a top view of a vehicle combination according to an example.

FIG. 3 schematically shows an example implementation of the control system 200 in a vehicle combination 100 according to the present disclosure. Each unit 110 of the vehicle combination 100 has a respective controller 300, including a respective unit control allocator 212. The tractor unit controller 300-1 also comprises a combination control allocator 210-1, and may be considered as the primary controller. In the example of FIG. 3, at least one trailing unit controller 300-2 to 300-*n* comprises an instance of the combination control allocator 210. As such, two or more of the controllers 300 of the vehicle combination 100 (for example, the tractor unit controller 300-1 and one or more of the trailing unit controllers 300-2 to 300-*n*) comprise an instance of the combination control allocator 210. This provides redundancy for the functions of the primary controller, as will be discussed below. While the primary controller is explained above as being tractor unit controller 300-1, it will be appreciated that the primary controller, including an instance of the combination control allocator 210, may be provided by the controller 300 of any unit 110 of the vehicle combination 100. This configuration allows the control system 200 to operate in two different modes of operation, as will be explained in relation to FIGS. 4A and 4B.

As shown in FIG. 3, the control system 200 may also comprise one or more monitors 302. For example, a respective monitor 302 may be implemented in one of more of the controllers 300 of the vehicle combination 100. In some examples, the monitor 302 may be provided remotely from the vehicle combination 100, but communicatively coupled to the vehicle combination 100. The monitor 302 is configured to monitor operation of the primary controller and/or the unit in which the primary controller is located, and detect a fault. For example, a monitor 302 may receive or determine one or more operational parameters related to the primary controller and/or its unit, and compare these to known or expected values. Operation of the monitor 302 will be described in more detail in relation to FIG. 5.

In some examples, one or more of the controllers 300 may also comprise unit specific control allocators 212 for one or more other units 110. For example, the secondary controller 300-2 may comprise an instance of the unit specific control allocator 212-1 for the first unit 110-1. This may enable unit-level control from another unit 110 of the vehicle combination (i.e. determination of unit-specific true control inputs $u_k$, for another unit 110).

Figure 4A:
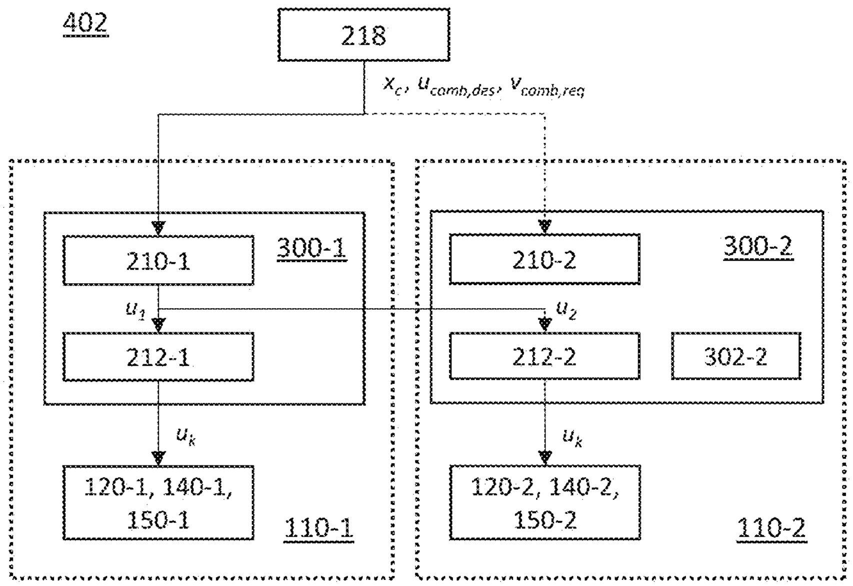
FIG. 4A schematically shows, in terms of functional blocks, a first mode of operation for the control system according to an example.
Figure 4B:
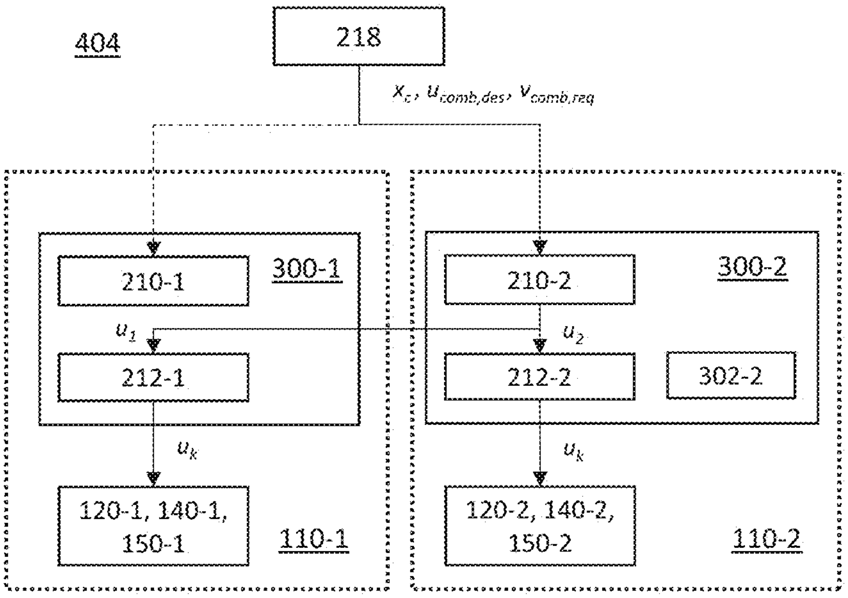
FIG. 4B schematically shows, in terms of functional blocks, a second mode of operation for the control system according to an example.

FIGS. 4A and 4B schematically show two different modes of operation 402, 404 for the control system 200. The first mode of operation 402 may be known as a standard mode, normal mode, default mode or the like, and be employed during normal operation of the vehicle combination 100. The second mode of operation 404 may be triggered by detection of a fault associated with the primary controller and/or its unit. Alternatively, the second mode of operation 404 may be activated in another manner, for example via an input an operator of the vehicle combination 100, such as in the case that the unit of the primary controller is switched out for another unit. The second mode of operation 404 may be known as a secondary mode, backup mode, fault mode, or the like.

These modes of operation 402, 404 are illustrated in FIGS. 4A and 4B in the context of a vehicle combination 100 comprising a first unit 110-1 and a second unit 110-2, for example a tractor unit 110-1 and a trailing unit 110-2. As discussed above, the units 110-1, 110-2 have respective controllers 300-1, 300-2 and actuators, for example in the form of electrical machines 120-1, 120-2, service brakes 140-1, 140-2, and steering actuators 150-1, 150-2. Each controller 300-1, 300-2 comprises a respective instance of the combination control allocator 210-1, 210-2 as well as a respective unit control allocator 212-1, 212-2. The controller 300-2 of the second unit 110-2 also comprises a monitor 302-2. In this configuration, the controller 300-1 of the first unit 110-1 may be considered as the primary controller, while the controller 300-2 of the second unit 110-2 may be considered as a secondary controller. The target generator 202, tactical layer 204, state estimator 206, and energy manager 208 are implemented remotely from the vehicle combination 100 and are communicatively coupled to the vehicle combination 100, in particular the controllers 300-1, 300-2.

It will be appreciated that the configuration illustrated in FIGS. 4A and 4B is an example only, and different combination of units 110, controllers 300, and monitors 302 can be used to implement the control system 200 in a vehicle combination 100. For example, it will be appreciated that these modes of operation 402, 404 may be implemented in vehicle combinations 100 comprising more than two units. Furthermore, the primary controller may not be in the first (or tractor) unit 110-1), but in any other suitable unit 110 of the vehicle combination 100. Furthermore, the motion and energy manager 218 may be implemented in any suitable controller 300, such as the primary controller. The combination control allocator 210 may also be implemented remotely, for example co-located with 202-208.

FIG. 4A schematically shows the first mode of operation 402 for the control system 200. In the first mode of operation 402, the primary controller 300-1 receives data from the motion and energy manager 218 as discussed in relation to FIG. 2, such as the virtual combination control input $v_{comb,req}$, the unit-specific state information $x_c$, and the power allocation input $u_{comb,des}$. In particular, these data are received by the combination control allocator 210-1 of the primary controller 300-1. The combination control allocator 210-1 of the primary controller 300-1 then provides requested unit control inputs $u_1$, $u_2$ to the unit control allocator 212-1, 212-2 of each unit 110-1, 110-2. The unit control allocators 212-1, 212-2 then provide unit-specific true control inputs $u_k$, describing actual actuator commands, to the actuators of the respective unit (e.g. the electrical machines 120-1, 120-2, service brakes 140-1, 140-2, and steering actuators 150-1, 150).

In the first mode of operation 402, the combination control allocator 210-2 of the secondary controller 300-2 may also receive data from the motion and energy manager 218, such as the virtual combination control input $v_{comb,req}$, the unit-specific state information $x_c$, and the power allocation input $u_{comb,des}$. However, in the first mode of operation 402, the combination control allocator 210-2 of the secondary controller 300-2 may take no further action.

FIG. 4B schematically shows the second mode of operation 404 for the control system 200. In the second mode of operation 404, the secondary controller 300-2 receives data from the motion and energy manager 218, such as the virtual combination control input $v_{comb,req}$, the unit-specific state information $x_c$, and the power allocation input $u_{comb,des}$. In particular, these data are received by the combination control allocator 210-2 of the secondary controller 300-2. The combination control allocator 210-2 of the secondary controller 300-2 then provides the requested unit control inputs $u_1$, $u_2$ to the unit control allocator 212-1, 212-2 of each unit 110-1, 110-2. The unit control allocators 212-1, 212-2 then provide unit-specific true control inputs $u_k$, describing actual actuator commands, to the actuators of the respective unit (e.g. the electrical machines 120-1, 120-2, service brakes 140-1, 140-2, and steering actuators 150-1, 150). As such, in the second mode of operation 404, the secondary controller 300-2 performs the role usually performed (in the first mode of operation 402) by the primary controller 300-1.

In the second mode of operation 404, the combination control allocator 210-1 of the primary controller 300-1 may also receive data from the motion and energy manager 218, such as the virtual combination control input $v_{comb,req}$, the unit-specific state information $x_c$, and the power allocation input $u_{comb,des}$. However, in the second mode of operation 404, the combination control allocator 210-1 of the primary controller 300-1 may take no further action, for example as there is a fault associated with the primary controller 300-1 and/or the first unit 110-1.

As discussed above, in some examples, the secondary controller 300-2 may comprise an instance of the unit specific control allocator 212-1 for the first unit 110-1. This may enable the secondary controller 300-2 to provide a unit-specific true control inputs $u_1$ to the actuators of the first unit 110-1. This may also be useful in the case of complete failure of the primary controller 300-1 and/or the first unit 110-1, and in cases where the combination control allocator 210 is implemented remotely from the vehicle combination 100 and the controllers only comprise unit specific control allocators 212.

These two modes of operation provide redundancy for the functions of the primary controller 300-1. By implementing the secondary controller 300-2 in a different unit from the primary controller 300-1, it can be used independent of the status of the primary controller 300-1 and the first unit 110-1 (e.g. in case of failure of the primary controller 300-1 or the first unit 110-1). Another advantage of this approach is that the combination control allocator 210-2 can be implemented in an existing controller 300-2, which may already be implemented in the second unit 110-2 in order to provide the unit control allocator 212-2. The controller 300-2 can therefore be used as a secondary controller for the vehicle combination 100, and take over in case of a fault with the primary controller 300-1, thus negating the need for the additional infrastructure required for an additional independent back-up controller. It will be appreciated that, in a vehicle combinations 100 comprising more than two units, any or all of the trailing units may comprise a controller 300 that can be configured as a secondary controller.

As discussed above, the second mode of operation 404 may be triggered by detection of a fault associated with the primary controller 300-1 and/or the first unit 110-1. The fault detection may be performed by the monitor 302-2.

In some examples, the monitor 302-2 is configured to detect the fault by comparing the requested unit control input $u_2$ for the second unit 110-2 to the data received from the motion and energy manager 218 (such as the virtual combination control input $v_{comb,req}$, the unit-specific state information $x_c$, and the power allocation input $u_{comb,des}$). For example, by comparing the requested unit control input $u_2$ to the virtual combination control input $v_{comb,req}$, the monitor 302-2 may be able to determine a significant difference between the values. In some examples, the monitor 302-2 may be able to receive requested unit control inputs for other units 110, and make a comparison to the virtual combination control input $v_{comb,req}$ on a combination level. If the comparison indicates that the requested unit control input $u_2$ for the second unit 110-2 is outside a threshold value of that expected from the virtual combination control input $v_{comb,req}$, then it can be determined that there is a fault with the primary controller 300-1 and/or the first unit 110-1.

In some examples, the monitor 302-2 is configured to detect the fault by comparing the requested unit control input $u_2$ for the second unit 110-2 to one or more limits, for example limits defining safe operation of the vehicle combination 100. If the comparison indicates that the requested unit control input $u_2$ for the second unit 110-2 is outside a predetermined limit, then it can be determined that there is a fault with the primary controller 300-1 and/or the first unit 110-1.

In some examples, the monitor 302-2 is configured to detect the fault by determining covariance values associated with the primary controller 300-1 and/or the first unit 110-1. For example, the monitor 302-2 may configured to determine covariance values that describe the uncertainty of data received from the primary controller 300-1. These values may be determined in any suitable manner known in the art. If the covariance values outside a threshold, then it can be determined that there is a fault with the primary controller 300-1 and/or the first unit 110-1.

In some examples, the monitor 302-2 may be configured to receive fault data related to the primary controller and/or its unit. The fault data may be data from a smoke detector indicating there is a fire in the primary controller 300-1 and/or the first unit 110-1. The fault data may be data indicating that a battery associated with the primary controller 300-1 is depleted. The fault data may relate to a fault in the communication line between the first unit 110-1 and the second unit 110-2, such as an absence or delay in communication between the first unit 110-1 and the second unit 110-2. Other types of fault that can be detected directly will be readily envisaged by the skilled person.

Figure 5:
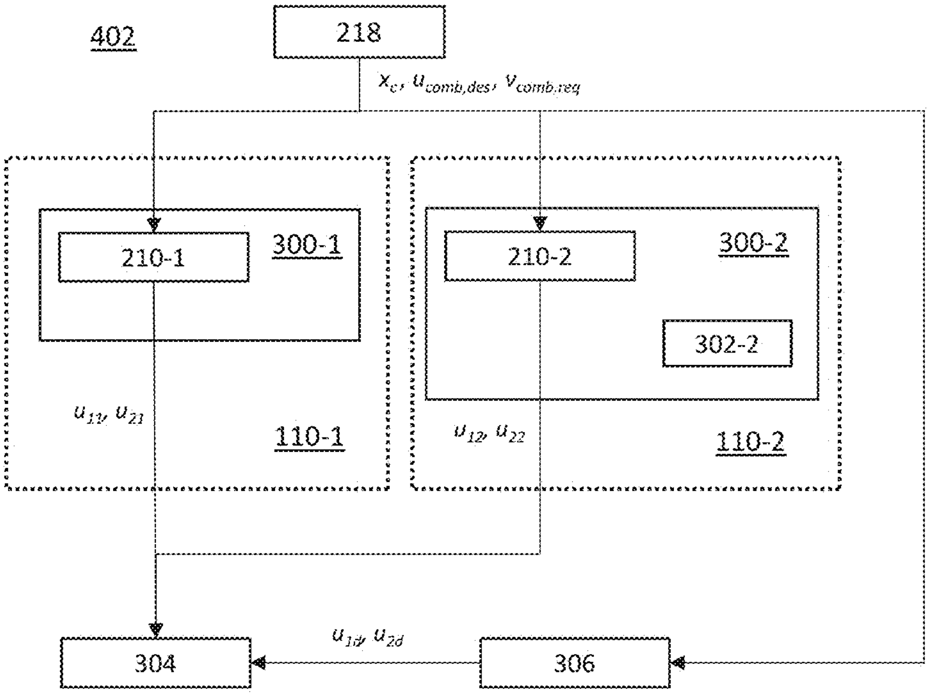
FIG. 5 schematically shows, in terms of functional blocks, an implementation of the control system according to another example.

FIG. 5 schematically shows another example implementation of the control system 200 in a vehicle combination 100 according to the present disclosure. The example of FIG. 5 corresponds generally to that of FIGS. 4A and 4B, although the control system 200 further comprises a comparator 304 and an optional dummy controller 306 that can be used to detect a fault. The comparator 304 and/or the dummy controller 306 may be implemented remotely from the vehicle combination 100, for example co-located with the motion and energy manager 218, or may be implemented together or separately in one or more suitable units 110 of the vehicle combination 100. The control system 200 is shown in the first mode of operation 402. For example, the comparator 304 and/or the dummy controller 306 may be implemented in the monitor 302-2.

In the example of FIG. 5, in the first mode of operation 402, the combination control allocator 210-2 of the secondary controller 300-2 also receives data from the motion and energy manager 218 (such as the virtual combination control input $v_{comb,req}$, the unit-specific state information $x_c$, and the power allocation input $u_{comb,des}$). In particular, these data are received by the combination control allocator 210-2 of the secondary controller 300-2. However, in this example, the combination control allocator 210-2 of the secondary controller 300-2 also determines unit control inputs $u_{12}$, $u_{22}$. This can be considered as a predicted unit control input for first unit 110-1 and the second unit 110-2. The requested unit control inputs $u_{11}$, $u_{21}$ from the primary controller 300-1 (which are the same as the requested unit control inputs $u_1$, $u_2$ in FIG. 4A) and the predicted unit control input $u_{12}$, $u_{22}$ from the secondary controller 300-2 are then provided to the comparator 304. The comparator 304 is configured to compare the requested unit control input from the primary controller 300-1 to the predicted unit control input from the secondary controller 300-2. If there is a difference between the two sets of requested unit control inputs, for example if they differ by a threshold amount, it can be determine that there is a fault. The fault may be associated with the primary controller 300-1 and/or the secondary controller 300-2. This may be further investigated to determine which controller has the fault, for example based on sensor signals or the like.

In some examples, the control system 200 further comprises a dummy controller 306. In the first mode of operation 402, a dummy controller 306 also receives data from the motion and energy manager 218 (such as the virtual combination control input $v_{comb,req}$, the unit-specific state information $x_c$, and the power allocation input $u_{comb,des}$) and determines dummy unit-specific virtual control inputs $u_{1d}$, $u_{2d}$. These can be considered as a dummy unit control input for first unit 110-1 and the second unit 110-2. The dummy unit control input $u_{1d}$, $u_{2d}$ is then provided to the comparator 304 along with the requested unit control input $u_{11}$, $u_{21}$ from the primary controller 300-1 and the predicted unit control input $u_{12}$, $u_{22}$ from the secondary controller 300-2. The comparator 304 is configured to compare the requested unit control input from the primary controller 300-1, the predicted unit control input from the secondary controller 300-2, and the dummy unit control input from the dummy controller 306. Based on this comparison, it can be determined which of the primary controller 300-1 and/or the secondary controller 300-2 has a fault. For example, if the requested unit control input from the primary controller 300-1 is further from the dummy unit control input from the dummy controller 306 than the predicted unit control input from the secondary controller 300-2, it can be determined that the primary controller 300-1 has a fault. On the other hand, if the predicted unit control input from the secondary controller 300-2 is further from the dummy unit control input from the dummy controller 306 than the requested unit control input from the primary controller 300-1, it can be determined that the secondary controller 300-2 has a fault. Similarly, the requested unit control input from the primary controller 300-1 and/or the predicted unit control input from the secondary controller 300-2 is above a threshold difference from the dummy unit control input from the dummy controller 306, it can be determined that the controller at issue (in some cases, both controllers 300-1, 300-2) has a fault.

In some examples, the control system 200 further comprises an emergency controller configured to implement a minimum risk manoeuvre in response to detection of a fault associated with one or more other controllers. For example, the emergency controller may be configured to implement a manoeuvre to stop the vehicle combination 100 at a safe place. The emergency controller could be triggered, for example, in cases where the motion and energy manager 218 is implemented in a unit of the vehicle combination 100 that experiences critical failure (e.g. fire) and cannot even generate or receive a reference input. This manoeuvre could be hard coded into the controller of another unit of the vehicle combination 100.

Figure 6A:
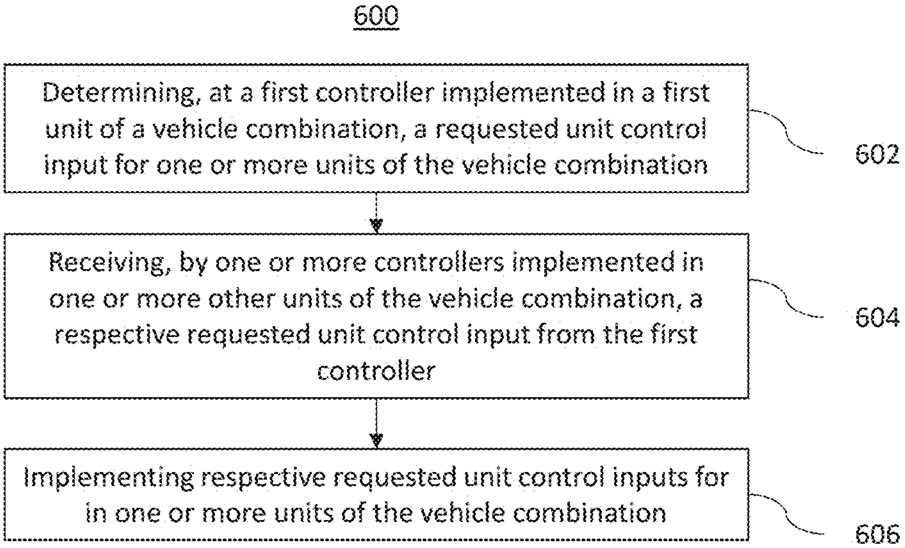
FIG. 6A is a flow chart of a computer-implemented method according to an example.

FIG. 6A is a flow chart of a computer-implemented method 600 according to an example. The method 600 corresponds to the first mode of operation 402 shown in FIG. 4A. The method 600 may be implemented in the control system 200, as discussed above.

At 602, a requested unit control input $u_i$ for one or more units 110 of the vehicle combination 100 is determined. The requested unit control input $u_i$ is determined at the primary controller. The primary controller may be, for example, the controller 300-1 of the first unit 110-1, although the primary controller may be implemented in any suitable unit 110 of the vehicle combination 100. As discussed above, the requested unit control input $u_i$ is determined based on a reference input $r_{req}$ representing a requested movement of the vehicle combination. For example, the primary controller may receive data from the motion and energy manager 218, such as the virtual combination control input $v_{comb,req}$, the unit-specific state information $x_c$, and the power allocation input $u_{comb,des}$, or the motion and energy manager 218 may be implemented in the primary controller.

At 604, one or more controllers implemented in one or more other units 110 of the vehicle combination 100 receive a requested unit control input $u_i$ for their respective unit from the primary controller. For example, the controller 300-2 of the second unit 110-2 unit may receive a requested unit control input $u_2$ from the controller 300-1 of the first unit 110-1. It will be appreciated that each unit 110 of the vehicle combination 100 may receive a respective requested unit control input $u_i$ from the primary controller.

At 606, the controllers implement their respective requested unit control inputs $u_i$ in their respective unit 100. For example, the one or more other controllers implement the respective requested unit control inputs $u_i$ received at 604 in their respective unit 100 (e.g. the controller 300-2 may implement the requested unit control input $u_2$ in the second unit 110-2). It will be appreciated that each controller 300 of the vehicle combination 100 may implement a respective requested unit control input $u_i$ in a respective unit 110. In the case that the primary controller is associated with a unit 110 of the vehicle combination 100, it implements the requested unit control input for that unit. For example, the controller 300-1 may implement a requested unit control input $u_1$ in the first unit 110-1.

As mentioned above, the method 600 corresponds to the first mode of operation 402 shown in FIG. 4A, and therefore corresponds to standard, normal, or default operation of the vehicle combination 100. The method 600 is implemented until a fault is detected in the primary controller and/or its unit, or until the second mode of operation 404 is otherwise activated, for example by an operator of the vehicle combination 100.

Figure 6B:
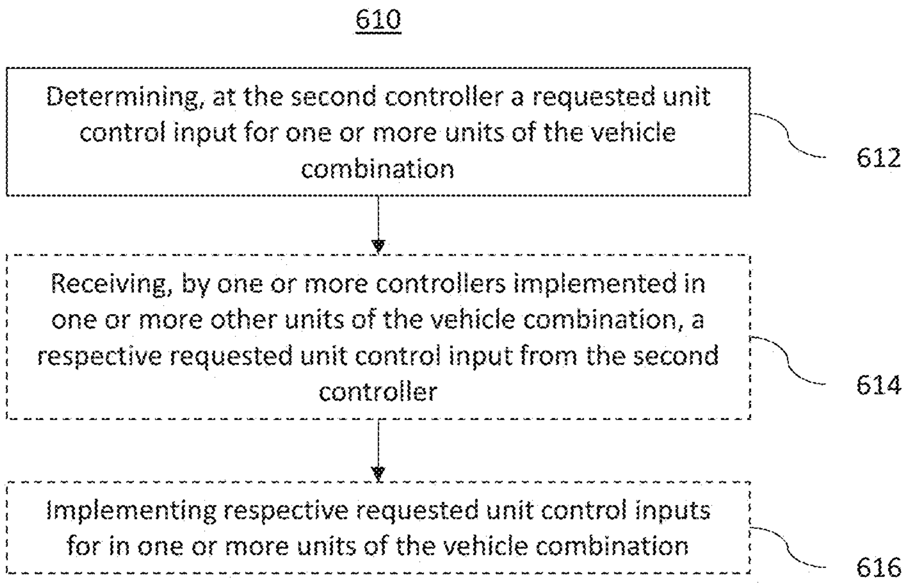
FIG. 6B is a flow chart of a computer-implemented method according to an example.

FIG. 6B is a flow chart of another computer-implemented method 610 according to an example. The method 610 corresponds to the second mode of operation 404 shown in FIG. 4B. The method 600 may be implemented in the control system 200, as discussed above.

At 612, a requested unit control input $u_i$ for one or more units 110 of the vehicle combination 100 is determined, but now at the secondary controller. The secondary controller may be, for example, the controller 300-2 of the second unit 110-2, although the secondary controller may be implemented in any suitable unit 110 of the vehicle combination 100. As discussed above, the requested unit control input $u_i$ is determined based on a reference input $r_{req}$ representing a requested movement of the vehicle combination. For example, the secondary controller may receive data from the motion and energy manager 218, such as the virtual combination control input $v_{comb,req}$, the unit-specific state information $x_c$, and the power allocation input $u_{comb,des}$, or the motion and energy manager 218 may also be implemented in the secondary controller.

At 614, one or more controllers implemented in other units 110 of the vehicle combination 100 receive a requested unit control input $u_i$ for the respective unit from the secondary controller. For example, the controller 300-1 of the first unit 110-1 unit may receive a requested unit control input $u_1$ from the controller 300-2 of the second unit 110-2. It will be appreciated that each unit 110 of the vehicle combination 100 may receive a respective requested unit control input $u_i$ from the secondary controller.

616, the controllers implement their respective requested unit control inputs $u_i$ in their respective unit 100. For example, the one or more other controllers implement the respective requested unit control inputs $u_i$ received at 614 in their respective unit 100 (e.g. the controller 300-1 may implement the requested unit control input $u_1$ in the first unit 110-1). The secondary controller also implements the requested unit control input $u_2$ in the second unit 110-2. It will be appreciated that each unit 110 of the vehicle combination 100 may implement a respective requested unit control input $u_i$ in a respective unit 110. In this way, the secondary controller takes over the functions of the primary controller when in the second mode of operation 404, for example if a fault is detected in the primary controller and/or its unit.

In some examples, the secondary controller and/or another controller may comprise an instance of a unit specific control allocator 212 for another unit 110. This may enable the unit-specific true control inputs $u_k$ to be provided the actuators of each unit 110, even in the case of failure of that unit's controller. This may also be useful in the case where the combination control allocator 210 is implemented remotely from the vehicle combination 100, and the controllers only comprise unit specific control allocators 212.

The methods 600 and 610 provide an approach to vehicle motion management that provides redundancy for the functions of a primary controller. By implementing a secondary controller in a different unit from the primary controller, it can be used independent of the status of the primary controller and its unit (e.g. in case of failure). Another advantage of this approach is that these functions can be provided by a controller that may already be implemented in the vehicle combination, thus negating the need for the additional infrastructure required for an additional independent back-up controller.

Figure 7:
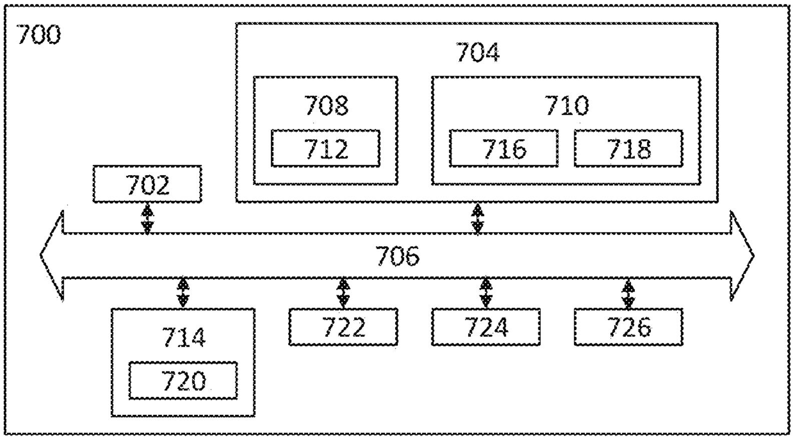
FIG. 7 is a schematic diagram of a computer system for implementing examples disclosed herein.

FIG. 7 is a schematic diagram of a computer system 700 for implementing examples disclosed herein. The computer system 700 is adapted to execute instructions from a computer-readable medium to perform these and/or any of the functions or processing described herein. The computer system 700 may be connected (e.g., networked) to other machines in a LAN, an intranet, an extranet, or the Internet. While only a single device is illustrated, the computer system 700 may include any collection of devices that individually or jointly execute a set (or multiple sets) of instructions to perform any one or more of the methodologies discussed herein. Accordingly, any reference in the disclosure and/or claims to a computer system, computing system, computer device, computing device, control system, control unit, electronic control unit (ECU), processor device, processing circuitry, etc., includes reference to one or more such devices to individually or jointly execute a set (or multiple sets) of instructions to perform any one or more of the methodologies discussed herein. For example, control system may include a single control unit or a plurality of control units connected or otherwise communicatively coupled to each other, such that any performed function may be distributed between the control units as desired. Further, such devices may communicate with each other or other devices by various system architectures, such as directly or via a Controller Area Network (CAN) bus, etc.

The computer system 700 may comprise at least one computing device or electronic device capable of including firmware, hardware, and/or executing software instructions to implement the functionality described herein. The computer system 700 may include processing circuitry 702 (e.g., processing circuitry including one or more processor devices or control units), a memory 704, and a system bus 706. The computer system 700 may include at least one computing device having the processing circuitry 702. The system bus 706 provides an interface for system components including, but not limited to, the memory 704 and the processing circuitry 702. The processing circuitry 702 may include any number of hardware components for conducting data or signal processing or for executing computer code stored in memory 704. The processing circuitry 702 may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processing circuitry 702 may further include computer executable code that controls operation of the programmable device.

The system bus 706 may be any of several types of bus structures that may further interconnect to a memory bus (with or without a memory controller), a peripheral bus, and/or a local bus using any of a variety of bus architectures. The memory 704 may be one or more devices for storing data and/or computer code for completing or facilitating methods described herein. The memory 704 may include database components, object code components, script components, or other types of information structure for supporting the various activities herein. Any distributed or local memory device may be utilized with the systems and methods of this description. The memory 704 may be communicably connected to the processing circuitry 702 (e.g., via a circuit or any other wired, wireless, or network connection) and may include computer code for executing one or more processes described herein. The memory 704 may include non-volatile memory 708 (e.g., read-only memory (ROM), erasable programmable read-only memory (EPROM), electrically erasable programmable read-only memory (EEPROM), etc.), and volatile memory 710 (e.g., random-access memory (RAM)), or any other medium which can be used to carry or store desired program code in the form of machine-executable instructions or data structures and which can be accessed by a computer or other machine with processing circuitry 702. A basic input/output system (BIOS) 712 may be stored in the non-volatile memory 708 and can include the basic routines that help to transfer information between elements within the computer system 700.

The computer system 700 may further include or be coupled to a non-transitory computer-readable storage medium such as the storage device 714, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 714 and other drives associated with computer-readable media and computer-usable media may provide non-volatile storage of data, data structures, computer-executable instructions, and the like.

Computer-code which is hard or soft coded may be provided in the form of one or more modules. The module(s) can be implemented as software and/or hard-coded in circuitry to implement the functionality described herein in whole or in part. The modules may be stored in the storage device 714 and/or in the volatile memory 710, which may include an operating system 716 and/or one or more program modules 718. All or a portion of the examples disclosed herein may be implemented as a computer program 720 stored on a transitory or non-transitory computer-usable or computer-readable storage medium (e.g., single medium or multiple media), such as the storage device 714, which includes complex programming instructions (e.g., complex computer-readable program code) to cause the processing circuitry 702 to carry out actions described herein. Thus, the computer-readable program code of the computer program 720 can comprise software instructions for implementing the functionality of the examples described herein when executed by the processing circuitry 702. In some examples, the storage device 714 may be a computer program product (e.g., readable storage medium) storing the computer program 720 thereon, where at least a portion of a computer program 720 may be loadable (e.g., into a processor) for implementing the functionality of the examples described herein when executed by the processing circuitry 702. The processing circuitry 702 may serve as a controller or control system for the computer system 700 that is to implement the functionality described herein.

The computer system 700 may include an input device interface 722 configured to receive input and selections to be communicated to the computer system 700 when executing instructions, such as from a keyboard, mouse, touch-sensitive surface, etc. Such input devices may be connected to the processing circuitry 702 through the input device interface 722 coupled to the system bus 706 but can be connected through other interfaces, such as a parallel port, an Institute of Electrical and Electronic Engineers (IEEE) 1394 serial port, a Universal Serial Bus (USB) port, an IR interface, and the like. The computer system 700 may include an output device interface 724 configured to forward output, such as to a display, a video display unit (e.g., a liquid crystal display (LCD) or a cathode ray tube (CRT)). The computer system 700 may include a communications interface 726 suitable for communicating with a network as appropriate or desired.

The operational actions described in any of the exemplary aspects herein are described to provide examples and discussion. The actions may be performed by hardware components, may be embodied in machine-executable instructions to cause a processor to perform the actions, or may be performed by a combination of hardware and software. Although a specific order of method actions may be shown or described, the order of the actions may differ. In addition, two or more actions may be performed concurrently or with partial concurrence.

According to certain examples, there is also disclosed:

Example 1: A computer system (200) for a vehicle combination (100), the computer system (200) comprising processing circuitry configured to implement a first controller (300, 300-1) implemented in a first unit (110, 110-1) of the vehicle combination (100), the first controller (300, 300-1) configured to, in a first mode of operation (402), determine a requested unit control input for one or more units (110) of the vehicle combination (100) based on a reference input representing a requested movement of the vehicle combination (100), and a second controller (300, 300-2) implemented in a second unit (110, 110-2) of the vehicle combination (100), the second controller (300, 300-2) configured to, in the first mode of operation (402), receive a requested unit control input for the second unit (110, 110-2) from the first controller (300, 300-1), and implement the requested unit control input for the second unit (110, 110-2) in the second unit (110, 110-2), and, in a second mode of operation (404), determine a requested unit control input for one or more units (110) of the vehicle combination (100) based on the reference input.

Example 2: The computer system (200) of example 1, wherein the second mode of operation (404) is triggered by detection of a fault associated with the first controller (300, 300-1) and/or the first unit (110, 110-1).

Example 3: The computer system (200) of example 2, wherein the processing circuitry is further configured to implement a monitor (302, 302-2) configured to monitor operation of the first controller (300, 300-1) and/or the first unit (110, 110-1) and detect the fault.

Example 4: The computer system (200) of example 3, wherein the monitor (302, 302-2) is configured to detect the fault by comparing the requested control input from the first controller (300, 300-1) with one or more requested unit control inputs and/or one or more limits.

Example 5: The computer system (200) of example 3 or 4, wherein the monitor (302, 302-2) is configured to detect the fault by determining sensor values and/or covariance values associated with one or more units (110) of the vehicle combination (100).

Example 6: The computer system (200) of any of examples 3 to 5, wherein the monitor (302, 302-2) is implemented in the second controller (300, 300-2).

Example 7: The computer system (200) of any preceding example, wherein, in the second mode of operation, the second controller (300, 300-2) is configured to implement a requested unit control input for the first unit (110, 110-1) in the first unit (110, 110-1).

Example 8: The computer system (200) of any preceding example, wherein the processing circuitry is further configured to implement a comparator (304) and, in the first mode of operation (402), the second controller (300, 300-2) is configured to determine a predicted unit control input for the one or more units (110) of the vehicle combination (100) based on the reference input, and the comparator (304) is configured to compare the one or more requested unit control inputs from the first controller (300, 300-1) and the one or more predicted unit control inputs from the second controller (300, 300-2), and, if there is a difference between the one or more requested unit control inputs and the one or more predicted unit control inputs, determine that there is a fault associated with the first controller (300, 300-1) or the second controller (300, 300-2).

Example 9: The computer system (200) of example 8, wherein the processing circuitry is further configured to implement a dummy controller (306) and, in the first mode of operation (402), the dummy controller (306) is configured to determine a dummy unit control input for the one or more units (110) of the vehicle combination (100) based on the reference input, and the comparator (304) is further configured to compare the one or more requested unit control inputs, the one or more predicted vehicle control inputs, and the one or more dummy vehicle control inputs, and determine which of the first controller (300, 300-1) or the second controller (300, 300-2) has a fault based on the comparison.

Example 10: The computer system (200) of any preceding example, wherein the processing circuitry is further configured to implement third controller configured to implement a minimum risk manoeuvre in response to detection of a fault associated with the first controller (300, 300-1) and/or the second controller (300, 300-2).

Example 11: The computer system (200) of any preceding example, wherein the first unit (110, 110-1) is a tractor unit of the vehicle combination (100), and the second unit (110, 110-2) is a trailing unit of the vehicle combination (100).

Example 12: A vehicle (100) comprising the computer system (200) of any preceding example.

Example 13: A computer-implemented method (600, 610) comprising, in a first mode of operation (402), determining (602), at a first controller (300, 300-1) implemented in a first unit (110, 110-1) of a vehicle combination (100), a requested unit control input for one or more units (110) of the vehicle combination (100) based on a reference input representing a requested movement of the vehicle combination (100), receiving (604), by a second controller (300, 300-2) implemented in a second unit (110, 110-2) of the vehicle combination (100), a requested unit control input for the second unit (110, 110-2) from the first controller (300, 300-1), and implementing (608), by the second controller (300, 300-2), the requested unit control input for the second unit (110, 110-2) in the second unit (110, 110-2), and, in a second mode of operation (404), determining (612), by the second controller (300, 300-2), a requested unit control input for one or more units (110) of the vehicle combination (100) based on the reference input.

Example 14: The computer-implemented method (600, 610) of example 13, wherein the second mode of operation (404) is triggered by detection of a fault associated with the first controller (300, 300-1) and/or the first unit (110, 110-1).

Example 15: The computer-implemented method (600, 610) of example 14, further comprising monitoring, by a monitor (300, 300-2), operation of the first controller (300, 300-1) and/or the first unit (110, 110-1) to detect the fault.

Example 16: The computer system (200) of example 15, wherein detecting the fault comprises comparing the requested control input from the first controller (300, 300-1) with one or more requested unit control inputs and/or one or more limits.

Example 17: The computer-implemented method (600, 610) of example 15 or 16, wherein detecting the fault comprises determining sensor values and/or covariance values associated with one or more units (110) of the vehicle combination (100).

Example 18: The computer-implemented method (600, 610) of any of examples 15 to 17, wherein the monitor (302, 302-2) is implemented in the second controller (300, 300-2).

Example 19: The computer-implemented method (600, 610) of any of examples 13 to 18, comprising, in the second mode of operation, implementing, by the second controller (300, 300-2), a requested unit control input for the first unit (110, 110-1) in the first unit (110, 110-1).

Example 20: The computer-implemented method (600, 610) of any of examples 13 to 19, further comprising, in the first mode of operation (402), determining, by the second controller (300, 300-2) a predicted unit control input for the one or more units (110) of the vehicle combination (100) based on the reference input, and comparing, by a comparator (304), the one or more requested unit control inputs from the first controller (300, 300-1) and the one or more predicted unit control inputs from the second controller (300, 300-2), and, if there is a difference between the one or more requested unit control inputs and the one or more predicted unit control inputs, determining, by the comparator (304), that there is a fault associated with the first controller (300, 300-1) or the second controller (300, 300-2).

Example 21: The computer-implemented method (600, 610) of example 20, further comprising, in the first mode of operation (402), determining, by a dummy controller (306), a dummy unit control input for the one or more units (110) of the vehicle combination (100) based on the reference input, and comparing, by the comparator (304), the one or more requested unit control inputs, the one or more predicted vehicle control inputs, and the one or more dummy vehicle control inputs, and determining, by the comparator (304), which of the first controller (300, 300-1) or the second controller (300, 300-2) has a fault based on the comparison.

Example 22: The computer-implemented method (600, 610) of any of examples 13 to 21, further comprising implementing, by a third controller, a minimum risk manoeuvre in response to detection of a fault associated with the first controller (300, 300-1) and/or the second controller (300, 300-2).

Example 23: The computer-implemented method (600, 610) of any of examples 13 to 22, wherein the first unit (110, 110-1) is a tractor unit of the vehicle combination (100), and the second unit (110, 110-2) is a trailing unit of the vehicle combination (100).

Example 24: A computer program product comprising program code for performing, when executed by processing circuitry, the computer-implemented method (600, 610) of any of examples 13 to 23.

Example 25: A non-transitory computer-readable storage medium comprising instructions, which when executed by processing circuitry, cause the processing circuitry to perform the computer-implemented method (600, 610) of any of examples 13 to 23.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

What is claimed is:

1. A computer system for a vehicle combination, the computer system comprising processing circuitry configured to implement:

a first controller implemented in a first unit of the vehicle combination, the first controller configured to, in a first mode of operation, determine a requested unit control input for one or more units of the vehicle combination based on a reference input representing a requested movement of the vehicle combination; and a second controller implemented in a second unit of the vehicle combination, the second controller configured to:

in the first mode of operation, receive a requested unit control input for the second unit from the first controller, and implement the requested unit control input for the second unit in the second unit; and in a second mode of operation, determine a requested unit control input for one or more units of the vehicle combination based on the reference input;

wherein the processing circuitry is further configured to implement a monitor in the second controller configured to monitor operation of the first controller and/or the first unit and detect a fault, wherein the processing circuitry is further configured to implement a comparator and, in the first mode of operation:

the second controller is configured to determine a predicted unit control input for the one or more units of the vehicle combination based on the reference input; and the comparator is configured to compare the one or more requested unit control inputs from the first controller and the one or more predicted unit control inputs from the second controller, and, if there is a difference between the one or more requested unit control inputs and the one or more predicted unit control inputs, determine that there is the fault associated with the first controller or the second controller.

2. The computer system of claim 1, wherein the second mode of operation is triggered by detection of the fault associated with the first controller and/or the first unit.

3. The computer system of claim 1, wherein the monitor is configured to detect the fault by comparing the requested control input from the first controller with one or more requested unit control inputs and/or one or more limits.

4. The computer system of claim 3, wherein the monitor is configured to detect the fault by determining sensor values and/or covariance values associated with one or more units of the vehicle combination.

5. The computer system of claim 1, wherein, in the second mode of operation, the second controller is configured to implement a requested unit control input for the first unit in the first unit.

6. The computer system of claim 1, wherein the processing circuitry is further configured to implement a dummy controller and, in the first mode of operation:

the dummy controller is configured to determine a dummy unit control input for the one or more units of the vehicle combination based on the reference input; and the comparator is further configured to compare the one or more requested unit control inputs, the one or more predicted vehicle control inputs, and the one or more dummy vehicle control inputs, and determine which of the first controller or the second controller has the fault based on the comparison.

7. The computer system of claim 1, wherein the processing circuitry is further configured to implement a third controller configured to implement a minimum risk manoeuvre in response to detection of the fault associated with the first controller and/or the second controller.

8. The computer system of claim 1, wherein the first unit is a tractor unit of the vehicle combination, and the second unit is a trailing unit of the vehicle combination.

9. A vehicle comprising the computer system of claim 1.

10. A computer-implemented method comprising:

in a first mode of operation:

determining, at a first controller in a first unit of a vehicle combination, a requested unit control input for one or more units of the vehicle combination based on a reference input representing a requested movement of the vehicle combination;

receiving, by a second controller implemented in a second unit of the vehicle combination, a requested unit control input for the second unit from the first controller; and implementing, by the second controller, the requested unit control input for the second unit in the second unit; and in a second mode of operation:

determining, by the second controller, a requested unit control input for one or more units of the vehicle combination based on the reference input:

the computer-implemented method further comprising monitoring, by a monitor implemented in the second controller, operation of the first controller and/or the first unit to detect a fault, comparing, by a comparator, in the first mode of operation, the one or more requested unit control inputs from the first controller and the one or more predicted unit control inputs from the second controller, and if there is a difference between the one or more requested unit control inputs and the one or more predicted unit control inputs, determining that there is the fault associated with the first controller or the second controller.

11. The computer-implemented method of claim 10, wherein the second mode of operation is triggered by detection of the fault associated with the first controller and/or the first unit.

12. The computer-implemented method of claim 10, wherein detecting the fault comprises comparing the requested control input from the first controller with one or more requested unit control inputs and/or one or more limits.

13. The computer-implemented method of claim 12, wherein detecting the fault comprises determining sensor values and/or covariance values associated with one or more units of the vehicle combination.

14. The computer-implemented method of claim 10, comprising, in the second mode of operation, implementing, by the second controller, a requested unit control input for the first unit in the first unit.

15. The computer-implemented method of claim 10, further comprising, in the first mode of operation:

determining, by a dummy controller, a dummy unit control input for the one or more units of the vehicle combination based on the reference input, and comparing, by the comparator, the one or more requested unit control inputs, the one or more predicted vehicle control inputs, and the one or more dummy vehicle control inputs, and determining, by the comparator, which of the first controller or the second controller has the fault based on the comparison.

16. The computer-implemented method of claim 10, further comprising implementing, by a third controller, a minimum risk manoeuvre in response to detection of the fault associated with the first controller and/or the second controller.

17. A computer program product comprising program code for performing, when executed by processing circuitry, the computer-implemented method of claim 10.

18. A non-transitory computer-readable storage medium comprising instructions, which when executed by processing circuitry, cause the processing circuitry to perform the computer-implemented method of claim 10.

* * * * *